United States Patent
Wang et al.

(10) Patent No.: US 11,882,327 B2
(45) Date of Patent: Jan. 23, 2024

(54) VERIFYING DISPLAY OF THIRD PARTY CONTENT AT A CLIENT DEVICE

(71) Applicant: Google LLC, Mountain View, CA (US)

(72) Inventors: Gang Wang, Jersey City, NJ (US); Alex Daniel Jacobson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 428 days.

(21) Appl. No.: 17/269,730

(22) PCT Filed: Feb. 6, 2020

(86) PCT No.: PCT/US2020/017027
§ 371 (c)(1),
(2) Date: Feb. 19, 2021

(87) PCT Pub. No.: WO2021/158229
PCT Pub. Date: Aug. 12, 2021

(65) Prior Publication Data
US 2022/0124393 A1    Apr. 21, 2022

(51) Int. Cl.
*H04N 21/2389*    (2011.01)
*H04L 9/08*       (2006.01)
(Continued)

(52) U.S. Cl.
CPC ..... *H04N 21/23892* (2013.01); *H04L 9/0825* (2013.01); *H04L 9/3213* (2013.01);
(Continued)

(58) Field of Classification Search
CPC ........ G06F 21/16; G06F 21/606; G06F 21/64; G06F 21/645; G06F 21/44;
(Continued)

(56) References Cited

U.S. PATENT DOCUMENTS 10,003,583 B2    6/2018  Dare et al.
2002/0138735 A1  9/2002  Felt et al.
(Continued)

FOREIGN PATENT DOCUMENTS

CN    101106455    10/2008
CN    107342998    11/2017
(Continued)

OTHER PUBLICATIONS

Office Action in Australian Appln. No. 2020260457, dated Sep. 3, 2021, 6 pages.
(Continued)

*Primary Examiner* — Olugbenga O Idowu
(74) *Attorney, Agent, or Firm* — Fish & Richardson P.C.

(57) ABSTRACT

Methods, systems, and apparatus, including computer programs encoded on a computer storage medium, for detecting errors that can occur in third party content presentation and verifying that third party content provided by a content provider to a content platform is actually displayed and is visible to the user when the content platform is accessed on the client device. Methods can include receiving, from an application executing on a client device, a request to generate a digitally signed token that is used to validate whether a particular content item displayed at the particular portion of the display is a third party content item. A digital watermark embedded at the particular portion of the display can be extracted and decoded to obtain data for attributes that are descriptive of the particular content item. A digitally signed token can be generated using this data, and the token can then be provided to application.

20 Claims, 4 Drawing Sheets

(51) Int. Cl.
  *H04L 9/32*     (2006.01)
  *H04N 21/235*   (2011.01)
  *H04N 21/435*   (2011.01)
  *H04N 21/8358*  (2011.01)

(52) U.S. Cl.
  CPC ....... *H04L 9/3247* (2013.01); *H04N 21/2355* (2013.01); *H04N 21/4353* (2013.01); *H04N 21/8358* (2013.01); *H04L 2209/608* (2013.01)

(58) Field of Classification Search
  CPC ............. H04L 2209/608; H04L 9/0847; H04L 9/0838; H04L 9/30; H04L 9/0825; H04L 9/3247; H04N 21/8358; H04N 21/83
  See application file for complete search history.

(56) References Cited

U.S. PATENT DOCUMENTS

| | | | |
|---|---|---|---|
| 2005/0278235 | A1 | 12/2005 | Dietrich |
| 2005/0278253 | A1 | 12/2005 | Meek et al. |
| 2009/0292924 | A1 | 11/2009 | Johnson et al. |
| 2010/0312653 | A1* | 12/2010 | Carpenter .......... G06Q 30/0277 713/176 |
| 2011/0123062 | A1 | 5/2011 | Hilu et al. |
| 2011/0161145 | A1 | 6/2011 | Ayeshwarya |
| 2012/0106735 | A1 | 5/2012 | Fukuda |
| 2014/0282696 | A1* | 9/2014 | Mao ................... G06Q 30/0277 725/32 |
| 2015/0150109 | A1 | 5/2015 | Bocanegra et al. |
| 2015/0295930 | A1 | 10/2015 | Dixon et al. |
| 2016/0285873 | A1 | 9/2016 | Lambert et al. |
| 2017/0142080 | A1 | 5/2017 | Hill |
| 2019/0012480 | A1 | 1/2019 | Thorwirth |
| 2019/0028892 | A1 | 1/2019 | Henry et al. |

FOREIGN PATENT DOCUMENTS

| | | |
|---|---|---|
| CN | 110291754 | 9/2019 |
| JP | H11-164132 | 6/1999 |
| KR | 10-2004-0055776 | 6/2004 |
| KR | 10-2019-0104401 | 9/2019 |
| WO | WO 0157783 | 8/2001 |
| WO | WO 2018/160863 | 9/2018 |
| WO | WO 2018/208997 | 11/2018 |

OTHER PUBLICATIONS

Notice of Allowance in Japanese Appln No. 2020-566231, dated Oct. 24, 2022, 5 pages (with English translation).
Notice of Allowance in Canada Appln. No. 3,100,347, dated Oct. 6, 2022, 1 page.
International Preliminary Report on Patentability in International Appln. No. PCT/US2020/016998, dated Aug. 18, 2022, 8 pages.
International Preliminary Report on Patentability in International Appln. No. PCT/US2020/017027, dated Aug. 18, 2022, 9 pages.
Office Action in Chinese Appln. No. 202080003023.1, dated Mar. 15, 2022, 11 pages (with English translation).
Office Action in Japanese Appln No. 2020-566224, dated Apr. 18, 2022, 5 pages (with English translation).
Office Action in Japanese Appln No. 2020-566231, dated Apr. 18, 2022, 6 pages (with English translation).
Office Action in Korean Appln. No. 10-2020-7034019, dated Aug. 10, 2022, 2 pages (with English translation).
Office Action Korean Appln. No. 10-2020-7032598, dated Nov. 20, 2021, 13 pages (with English translation).
Notice of Allowance in Canada Appln. No. 3,100,322, dated Jan. 18, 2023, 1 page.
AU Office Action in Australian Appln. No. 2020260456, dated May 27, 2021, 6 pages.
Gummadi et al., "Not-a-Bot: Improving Service Availability in the Face of Botnet Attacks," NSDI, Apr. 2009, 14 pages.
Li et al., "Adattester: Secure online mobile advertisement attestation using trustzone," Proceedings of the 13th annual international conference on mobile systems, applications, and services, May 2015, 14 pages.
PCT International Search Report and Written Opinion in International Appln. No. PCT/US2020/016998, dated Sep. 24, 2020, 15 pages.
PCT International Search Report and Written Opinion in International Appln. No. PCT/US2020/017027, dated Sep. 24, 2020 14 pages.
Office Action in Chinese Appln. No. 202080003023.1, dated Aug. 31, 2022, 5 pages (with English search report).
Office Action in Indian Appln. No. 202027047338, dated Sep. 13, 2022, 6 pages (with English translation).
Office Action in Indian Appln. No. 202027047339, dated Sep. 12, 2022, 7 pages (with English translation).
Hearing Notice in Indian Appln. No. 202027047339, dated May 26, 2023, 2 pages (with English translation).

* cited by examiner

VERIFYING DISPLAY OF THIRD PARTY CONTENT AT A CLIENT DEVICE

CROSS-REFERENCE TO RELATED APPLICATION

This application is a National Stage Application under 35 U.S.C. § 371 and claims the benefit of International Application No. PCT/US2020/017027, filed on Feb. 6, 2020, the disclosure of the prior application is considered part of and is incorporated by reference in the disclosure of this application.

BACKGROUND

This specification generally relates to detecting errors that can occur in third party content presentation and verifying that third party content provided by a content provider for display on a content platform is actually displayed when the content platform is accessed on the client device.

A client device can use an application (e.g., a web browser, a native application) to access a content platform (e.g., a search platform, a social media platform, or another platform that hosts content). The content platform can display, within an application launched on the client device, content that may be provided by one or more third party content providers. In some instances, content provided for display by the content provider may not actually be displayed within the application (or may be provided for display but not actually is visible to the user of the user device). This may be due to any number of reasons, such as errors in the application within which the content platform is provided for display, errors in the particular content page provided by the content platform, errors in the content platform in general, or errors in one or more content providers that provide content to the content platform.

SUMMARY

In general, one innovative aspect of the subject matter described in this specification can be embodied in methods including the operations of receiving, from an application executing on a client device, a request to generate a digitally signed token that is used to validate whether a particular content item, provided on a content page within the application and displayed at a particular portion of the display of the client device, is a third party content item provided by a content provider, wherein the request identifies the particular portion of the display; determining whether a digital watermark is embedded in the particular content item displayed at the particular portion of the display; in response to determining that a digital watermark is embedded in the particular content item: decoding the digital watermark to obtain data for a plurality of attributes encoded within the digital watermark, wherein the plurality of attributes are descriptive of the particular content item; generating the digitally signed token that includes the data for the plurality of attributes in a payload of the digitally signed token; and providing, to the application, the generated digitally signed token. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, methods can include the operations of validating, using the digitally signed token, whether the particular content item, which is provided on the content page within the application and displayed at the particular portion of the display of the client device, is the third party content item provided by the content provider, the validating includes: verifying that a digital signature included in the digitally signed token is valid, wherein the verifying includes generating a digital signature using data other than the digital signature included in the digitally signed token; obtaining, from the content provider, data for the plurality of attributes for the third party content item; and determining that the data for the plurality of attributes encoded in the digital watermark is identical to the data for the corresponding plurality of attributes obtained for the third party content item and in response, generating a message indicating that the particular content item is the third party content item.

In some implementations, methods can include the operations of, in response to determining that a digital watermark is not embedded in the particular content item, generating a digitally signed token that includes, in the payload of the digitally signed token, a message indicating that the third party content item is not visible in the particular portion of the display of the client device; and providing, to the application, the generated digitally signed token.

In some implementations, methods can include the operations of obtaining, using the particular portion of the display, a screenshot of the particular content item displayed at the particular portion of the display.

In some implementations, obtaining the digital watermark embedded in the particular content item includes obtaining the digital watermark from the obtained screenshot of the particular content item displayed at the particular portion of the display.

In some implementations, the obtained digital watermark can encode data about two or more of the following attributes: a content type of the third party content item; a description of content provided in the third party content item; an identification of the third party content provider; a unique identifier for the third party content item; size parameters of the third party content item; a timestamp indicating a time when the digital watermark was created; and a digital signature of the third party content provider.

In some implementations, the digitally signed token can be an attestation token that includes (1) a device public key of the client device; (2) a payload that includes the data for the plurality of attributes; (3) a device integrity token that identifies a trustworthiness of the client device, wherein the device integrity token is signed by a trusted device integrity system; and (4) a digital signature of the device public key, the payload, and the device integrity token, wherein the digital signature is generated using a device private key for the client device that corresponds to and is mathematically linked to the device public key.

In general, another innovative aspect of the subject matter described in this specification can be embodied in methods including the operations of receiving, from an application executing on a client device, a request to generate a digitally signed token that is used to validate whether a particular content item, which is provided on a content page within the application and displayed at a particular portion of the display of the client device, is a third party content item provided by a content provider, wherein: the request includes initial attestation data obtained an operating system of the client device, wherein the initial attestation data includes (1) decoded data for a plurality of attributes that was encoded within the digital watermark embedded in the particular content item displayed at the particular portion of the display, wherein the plurality of attributes are descriptive of the particular content item; (2) data identifying the particular portion of the display; and (3) a first data item that is generated using the decoded data and the data identifying the particular portion of the display; obtaining, from the operating system, an indication specifying whether the first data item matches a second data item, wherein the second data item is generated by the operating system using the decoded data and the data identifying the particular portion of the display that are included with the request; in response to obtaining the indication specifying that the first data item matches the second data item: generating a digitally signed token that includes the data for the plurality of attributes in the payload of the digitally signed token; providing, to the application, the generated digitally signed token. Other embodiments of this aspect include corresponding systems, devices, apparatus, and computer programs configured to perform the actions of the methods. The computer programs (e.g., instructions) can be encoded on computer storage devices. These and other embodiments can each optionally include at least the following feature.

In some implementations, each of the first data item and the second data item can be a hashed message authentication code.

Particular embodiments of the subject matter described in this specification can be implemented to realize one or more of the following advantages. Techniques described in this specification can identify errors, such as, e.g., software errors and bugs (which can also include, e.g., instances of fraud being perpetrated by a malicious entities) in a content page provided by a content platform, in the content platform, or in the application which is used to access the content platform's content pages. For example, software errors within the application, the particular content page, or in the content platform, may prevent third party content provided by a content provider from being displayed or result in other content covering or occluding the third party content that may be displayed on the content platform. In some instances, such software errors may be caused by a malicious entity, which may have compromised the application, the particular content page, or the content platform. The techniques described in this specification can verify that the third party content provided by a content provider is actually visible when the content platform is accessed on the client device. When the particular third party content provided by the content provider, which is expected to be displayed on the client device, is not visible to the user of the client device, that signals the presence of a software error in (1) the content page displayed on the client device, (2) the content platform, (3) the application, and/or (4) one or more content providers that provides content to the content platform.

The techniques described in this specification also provide an independent verification of whether third party content provided by a content provider is actually displayed on the client device and visible to the user of the device. In other words, the third party content verification techniques described in this specification do not simply rely upon the representations made by (e.g., data submitted by) the content platform regarding the content it displays within the application (as was the case in conventional solutions). Rather, the techniques described in this specification rely upon independent processing by the client device—e.g., the processing of the operating system, alone or in cooperation with a separate application executing on the client device—to perform such verification. The techniques described herein analyze the content provided on the content platform and displayed on the client device, and generate a token that can be used to verify whether this content is actually provided by the content provider and visible to the user of the user device.

Relatedly, the techniques described in this specification enable secure transmission, from the client device to the content provider (or another content verification entity), of the information that may be used by the content provider (or another content verification entity) to verify content displayed and visible to the user on the client device. A malicious application or entity may attempt to tamper with or forge the information provided by the client device to the content provider (or another content verification entity), which in turn may cause the content to be incorrectly verified. To avoid this, the techniques described in this specification utilize certain cryptographic techniques to secure the transmission of information from the client device to the content provider. As a result, the content verification process described in this specification is less likely to succumb to malicious or fraudulent actions designed to deceive the content provider (or another appropriate verification system) during the content verification process.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
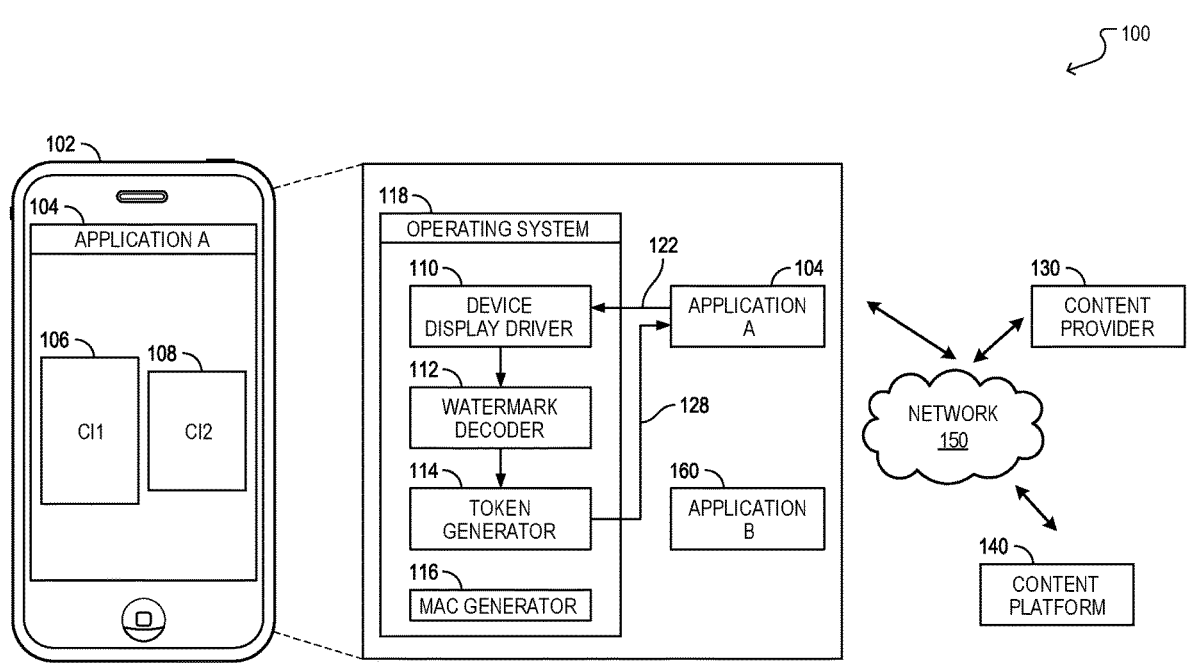
FIG. 1 is a block diagram of an example environment in which content is provided for display within a content platform accessed within an application on a client device.

This disclosure relates to computer implemented methods and systems for detecting errors that can occur in third party content presentation and verifying that third party content provided by a content provider for display on a content platform is actually displayed and visible to the user when the content platform is accessed on the client device.

A content platform may want to verify that certain content provided on its platform is actually displayed on the client device and visible to the user when the content platform is accessed within an application (e.g., a browser, a native application) executing on the client device. A content provider may also want to verify that the third party content that it provides to the content platform is actually displayed on the client device and is visible to the user when the content platform is accessed on the client device. The techniques described in this specification—as summarized below and as described in additional detail throughout this specification—enable such content verification by relying on trusted software processes (e.g., secure/privileged code of the operating system, a trusted system application) executing on a client device operating in cooperation with a content provider (or another appropriate content verification system).

As described throughout this specification, the operating system (or another trusted application on the client device or a web browser) receives a request from an application executing on a client device to generate a digitally signed token that may be partially or fully encrypted. This digitally signed token can be used to verify that a particular content item, provided on a content page within the application, displayed at a particular portion of the display of the client device and visible to the user, is a third party content item provided by a content provider.

The operating system (or another trusted application on the client device or a web browser) of the client device determines whether a digital watermark is embedded in the particular content item displayed at the particular portion of the display, e.g., a touch screen for mobile devices and an LCD/LED display for desktop computers. As used in this specification, a trusted application is an application that operates within a secured environment on the device and performs certain core device services (similar to device services performed by the privileged code within the operating system). If the operating system (or a web browser) does not identify a digital watermark in the content, it concludes that the third party content item provided by the content provider, which would include such a watermark, is not visible on the client device. This may be indicative of an error in the content page, the content platform, the application, or the content provider. On the other hand, if the operating system (or a web browser) identifies a digital watermark in the particular content item, it decodes the digital watermark to obtain data for multiple attributes (e.g., content item identifier, content type, content description, content creator, etc.) that are descriptive of the particular content item.

Using this decoded data, the operating system (or another trusted application on the client device or a web browser) generates a digitally signed token that includes the data for the multiple attributes in the payload of the digitally signed token. In some implementations, the digitally signed token is an attestation token that includes (1) the client device's unique identifier (e.g., the device's public key), (2) the payload, (3) a device integrity token that can be used to evaluate the client device's trustworthiness, and/or (4) a digital signature of the device identifier for the client device, the payload, and the device integrity token, that is generated using the client device's private key. The digitally signed token, and in particular the attestation token, ensures that the receiver of the digitally signed token can identify if any of the data included in the token's payload (or otherwise) has been tampered with or forged (as further described with reference to FIG. 2). In the case where the web browser generates the digitally signed token, the browser's native code generates the token. The browser native code has privilege that a script running on a webpage rendered by the browser does not have. It is generally very hard for Javascript to penetrate the browser native code.

The operating system (or another trusted application on the client device or a web browser) sends the digitally signed token to the content provider (or another appropriate content verification system). The content provider first validates whether the digitally signed token is authentic by verifying the digital signature. If not, the content provider concludes that its third party content item may not be displayed on the client device and that there may be an error in the content page, the content platform, or the application. If the content provider determines that the digitally signed token is authentic, it next determines whether the data for the attributes included in the payload match the data for the attributes of the third party content item provided by the content provider. If the content provider determines that the data for the attributes match, the content provider concludes that the particular content item provided for display and visible to the user in the particular portion of the device's display is indeed provided by the content provider. If not, the content provider concludes that its third party content item is not actually displayed on the client device and that there may be an error in the content page, the content platform, the application, or the content provider.

The above-described features and additional features are described in more detail below.

FIG. 1 an example environment 100 in which content is provided for display within a content platform accessed within an application on a client device. The example environment 100 includes a network 150, such as a local area network (LAN), a wide area network (WAN), the Internet, or a combination thereof. The network 150 connects client devices 102, content platforms 140, and content providers 130. The example environment 100 may include many different content providers 130, content platforms 140, and client devices 102.

A client device 102 is an electronic device that is capable of requesting and receiving content over the network 150. Example client devices 102 include personal computers, mobile communication devices, digital assistant devices, and other devices that can send and receive data over the network 150. A client device 102 typically includes a user application, such as a web browser, to facilitate the sending and receiving of data over the network 150, but native applications executed by the client device 102 can also facilitate the sending and receiving of content over the network 150. Examples of content presented at a client device 102 include webpages, word processing documents, portable document format (PDF) documents, images, videos, and search results pages.

A content platform 140 is a computing platform (such as, e.g., a data processing apparatus as described with reference to FIG. 4) that enables distribution of content. Example content platforms 140 include search engines, social media platforms, new platforms, data aggregator platforms, or other content sharing platforms. Each content platform 140 may be operated by a content platform service provider.

The content platform 140 can publish and make available its own content. For example, the content platform 140 may be a news platform, which publishes its own news articles. The content platform 140 may also present content provided by one or more content providers 130 that are not part of the content platform 140. In the above example, the news platform may also present third party content provided by one or more content providers 130. As another example, the content platform 140 may be a data aggregator platform that does not publish any of its own content, but aggregates and presents third party content provided by different content providers 130.

As used in this specification, a content provider 130 can be a data processing apparatus (as described with reference to FIG. 4) and can include servers, repositories, or other storage devices that store content generated and/or published by one or more entities that provide content to content platforms 140 and/or client devices 102 in response to requests for content from these entities.

When a client device 102 accesses a content page provided by a content platform 140 within an application, Application A 106 (such as a browser or a native application), a script (or native code in Application A) on the content page requests content from one or more content providers 130 that are not part of the content platform 140. In response to this request for content, a content provider 130 provides third party content that can be presented as content items (e.g., content item CI1 106 or content item CI2 108) within the application.

The client device 102 can work in cooperation with the content provider 130 to verify whether a particular content item, which is provided in the application and is displayed on the client device (such as CI1 106), is provided by the content provider 130 and is visible to the user. The techniques by which the client device 102 and the content provider 130 cooperatively perform this verification are summarized below and are described in additional detail with reference to FIGS. 2 and 3.

First, the content provider 130 includes a digital watermark in the content item that it provides to the content platform for display within the application. As used in this specification, a digital watermark embeds information within content in a visually-indistinguishable manner. In some implementations, the content provider 130 embeds the digital watermark into the content of the content item, rather than within the metadata of the content item. Embedding the digital watermark within the content of the content item enables decoding or extracting the watermark from the content item using only the screenshot of the content item (which only provides the content of the content item and not the metadata of the content item).

Moreover, the digital watermark embedded in the content item encodes one or more attributes that are descriptive of the content item. Examples of such attributes include, among others, (1) a content type of the content item (which can specify, e.g., whether the content is a video, audio, or text), (2) a description of the content of the content item, (3) an identification of the content provider (e.g., a numeric, alphanumeric, or other identifier that may uniquely identify the particular content provider 130 that provided the content item), (4) an identification of the content item (e.g., a numeric, alphanumeric, or other identifier that may unique identify the content item), (5) an identification of the creator of the content item (e.g., a numeric, alphanumeric, or other identifier that may unique identify the creator of the content item, which may be the same as or different from the content provider 130), (6) size parameters of the content item (e.g., parameters that specify the expected size of the content block in which the content provider 130 expects the content item to be provided), (7) a timestamp indicating a time when the digital watermark was created (e.g., a time and/or date when the watermark was created), and (8) a digital signature of the content provider 130 (e.g., the digital signature can be signed over the attributes encoded in the digital watermark). These attributes are subsequently used by the content provider 130 in validating whether a particular content was provided by the content provider and is visible to the user.

In some implementations, the content provider 130 embeds the digital watermark into the content of the content item by specifying adjustments/modifications to the pixel values (i.e., by adjusting color shades) of the different pixels that make up the content item. Although the adjustments might modify the colors of the content, it does so in a visually imperceptible manner—i.e., by making minor adjustments to the color of the content (e.g., changing a pixel from a particular color to a lighter shade of the particular color) without changing the color altogether (e.g., changing a pixel from a particular color, such as red, to a completely different color, such as blue).

Once the content provider 130 provides the content item to the application 104, the application 104 renders the content item—i.e., the application 104 can provide the content item for display within the application 104.

After the application 104 has rendered or provided for the display one or more content items on the content page, the application 104 (or the content item itself via the help of scripts) can seek verification that a particular content item, e.g., CI1 106, displayed within the application was indeed provided by the content provider 130 and is visible to the user.

In some implementations (as described with reference to FIG. 2), the application requests the operating system 118 of the client device 102 to generate a digitally signed token that is used to validate whether the content item CI1 106, which is provided on the content page within the application 104, displayed and visible to the user at a particular portion of the display of the client device, is the content item provided by the content provider 130. The privileged or trusted code within the operating system 118—which includes software components such as the device display driver 110, the watermark decoder 112, the token generator 114, and the MAC generator 116—are used in decoding the digital watermark, generating the digitally signed token, and providing the digitally signed token to the application 104. The application 104 provides this digitally signed token to the content provider 130, which in turn uses this digitally signed token in performing the content verification. The privileged or trusted code is code that runs only in kernel mode (i.e., code/instructions that can only be executed by the operating system and not by any other user, application, or entity). As a result, the privileged or trusted code is less likely to be vulnerable to penetration by other applications/entities.

In some implementations (as described with reference to FIG. 3), the operating system 118 decodes the digital watermark, and another application (i.e., an application 140 that is separate from the application 104) uses the information obtained from the decoded digital watermark in generating the digitally signed token.

Figure 2:
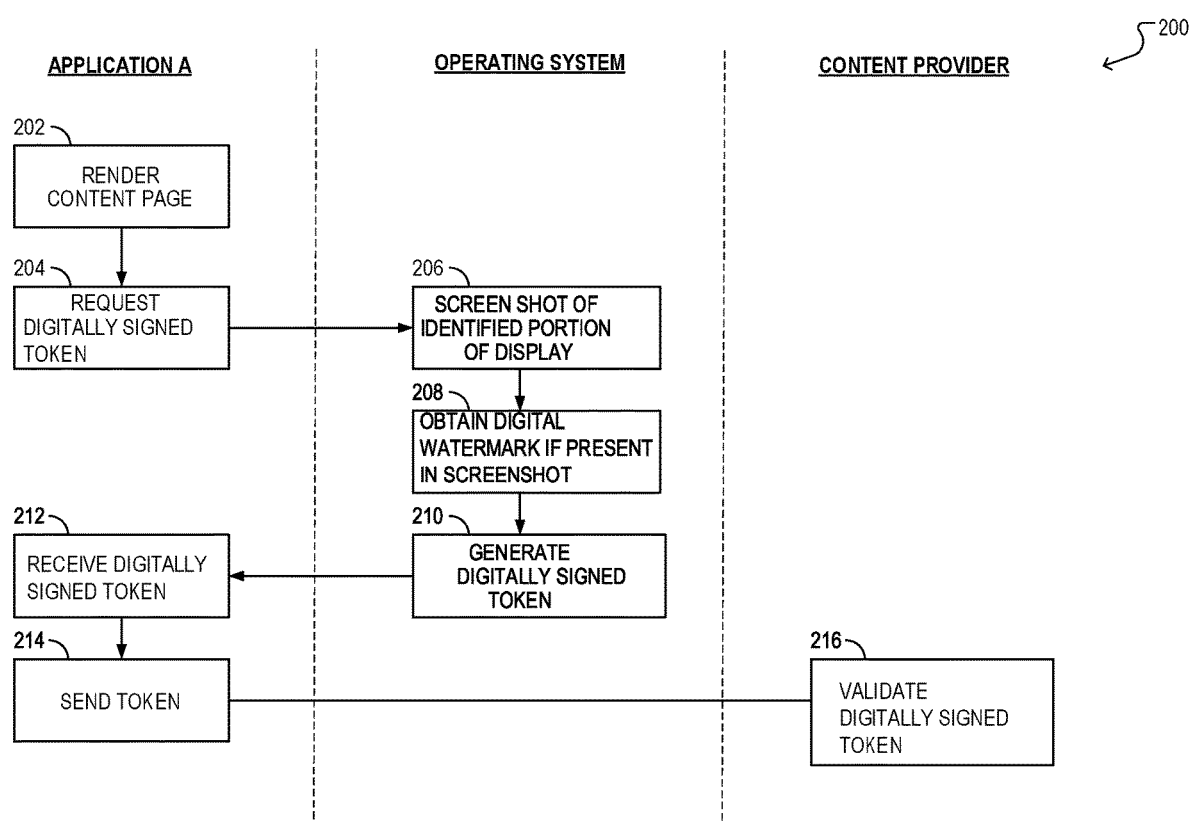
FIG. 2 a swim lane diagram that illustrates an example process for detecting errors and verifying that a particular content item provided on a content platform and displayed on a client device and visible to a user of the device, is provided by a content provider.
Figure 3:
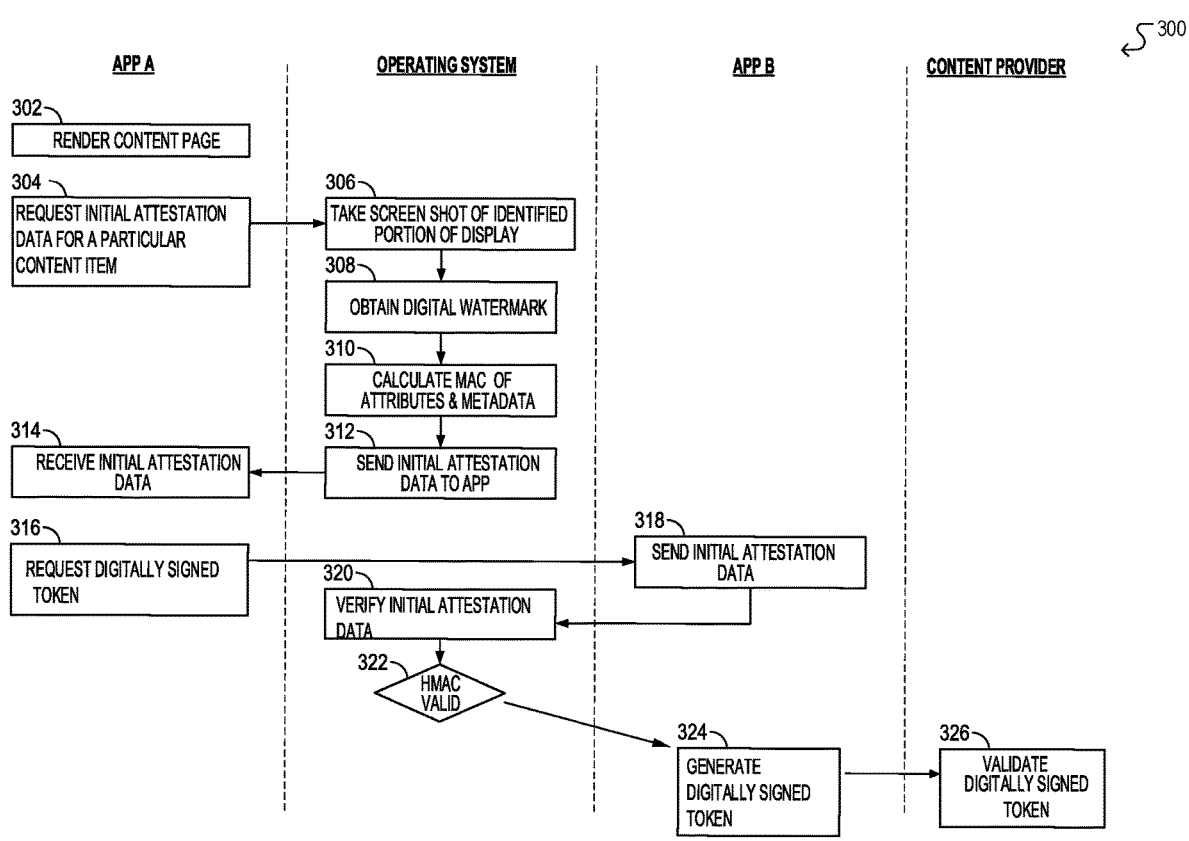
FIG. 3 is a swim lane diagram that illustrates another example process for detecting errors and verifying that a particular content item provided on a content platform and displayed on a client device and visible to a user of the device, is provided by a content provider.

The structure and/or operations of each of the above-referenced components of FIG. 1 are described in additional detail with reference to FIGS. 2 and 3.

FIG. 2 is a swim lane diagram that illustrates an example process 200 for detecting errors and verifying that a particular content item displayed on a client device is provided by a content provider and is visible to the user. Operations of process 200 are described below as being performed by the components of the system described and depicted in FIG. 1; however, such descriptions are for illustration purposes only. Operations of the process 200 can be performed by any appropriate device or system, e.g., any appropriate data processing apparatus as described with reference to FIG. 4. Operations of the process 200 can also be implemented as instructions stored on a non-transitory computer readable medium.

Application A 104 renders a content page (at 202), which includes providing within the application 104, content items CI1 106 and CI2 108. As described with reference to FIG. 1, one or more of these content items could be a third party content item that is obtained from a content provider 130.

Application A 104 sends a request to the operating system 118 to generate a digitally signed token (at 204) that is used to verify whether a particular content item, CI1 106—provided on a content page within the application 104, displayed at a particular portion of the display of the client device 102, and visible to the user of the client device 102—is a third party content item provided by a content provider 130. Details regarding the generation of the digitally signed token are described with reference to operation 210. In some implementations, the request to generate the digitally signed token is included as part of a request by the application A to verify content displayed within this application. This request, which is sent by the application 104 and is received by the operating system 118, also identifies the particular portion of the display of the client device where the particular content item, CI1 106, is displayed.

In some implementations, the application 104, which can be a native application, can include a software development kit (SDK) or an application programming interface (API) that cause the application 104 to generate the request and to provide, with the request, the coordinates of the display (or alternatively, specifies the range of pixels on the device's display) that demarcate the particular portion of the display where the particular content item is displayed. In implementations where the application 104 is a web browser, a script executing on the page can generate the request and provide with the request, the coordinates of the display (or alternatively, specifies the range of pixels on the device's display) that demarcate the particular portion of the display where the particular content item is displayed. In such implementations, if the operating system generates the digitally signed token, the script sends the request to the operating system 118. However, if the web browser generates the digitally signed token, the script sends the request to the native, privileged code of the web browser.

The operating system 118 (or the browser for web) obtains a screenshot of the particular portion of the display (at 206). In some implementations, the device display driver 110 uses the identification of the particular portion of the display (e.g., the coordinates or the pixel range), which was included in the request, to locate and generate a screenshot of the particular content item, CI1 106, provided for display in the particular portion of the display. In some implementations, the device display driver 110 provides the screenshot of the particular portion of the display to the watermark decoder 112. In some implementations, a the device driver of the operating system has a memory buffer that allows the device driver to build the entire bitmap in memory and shows the entire bitmap to the screen. In such implementations, obtaining a screenshot simply includes accessing the entire bitmap in memory and identifying the portion of the bitmap corresponding to the particular portion of the display.

Using the screenshot obtained from the device display driver 110, the watermark decoder 112 (which may be implemented in the operating system 118 or as part of a web browser) determines if a digital watermark is present in the screenshot and if so, decodes the digital watermark (at 206). The watermark decoder 112 can be implemented as a rules-based engine that stores rules specifying how data can be encoded in a particular content (e.g., using different patterns of pixel value adjustment) to obtain the data that was encoded into the content item as the digital watermark. Alternatively, the watermark decoder 112 can be implemented as a statistical model, such as a machine learning model (e.g., a supervised machine learning model). Such a model can obtain the digital watermark (i.e., the data encoded within a content item) from a screenshot of an input content item, and is trained using a set of screenshots of content items with an embedded digital watermark and a corresponding set of labels including the data encoded within the content item. Alternatively, the watermark decoder 112 can be implemented by first transforming the image into frequency domain using algorithms including Fourier Transform, or Wavelet Transform, then examining the low frequency components of the result.

In some implementations, the watermark decoder 112 first determines whether a digital watermark is embedded in the particular content item displayed at the particular portion of the display. This includes analyzing the screenshot of the particular content item to determine if any data is embedded in the particular content item as a digital watermark. For example, the pixel values of the particular content (i.e., of the screenshot of the particular portion of the display corresponding to the particular content item) are analyzed using a rules-based engine (or by another statistical model such as a machine learning model) to identify data that may be encoded within the content item as the digital watermark. If this analysis does not identify any such encoded data present in the particular content item, the watermark decoder 112 determines that no digital watermark is included in the particular content item. Based on this determination, the operating system 118 (or the web browser, if the web browser generates the digitally signed token) can conclude that the third party content item provided by the content provider 130 is either not displayed in the application 104, or if it is displayed, it is being hidden/covered by other content displayed within the application 104. In such instances, the operating system 118 (or the web browser, if the web browser generates the digitally signed token) generates a message indicating that the third party content item that was provided by the content provider 130 is not visible in the particular portion of the display of the client device.

On the other hand, if the analysis reveals that data is encoded within the content item, the watermark decoder 112 determines that a digital watermark is included in the particular content item. In this instance, the watermark decoder 112, using the rules-based engine or another appropriate statistical model (e.g., a machine learning model), decodes the digital watermark to obtain data for one or more attributes encoded within the digital watermark. As described with reference to FIG. 1, the data for these attributes are descriptive of the particular content item and can be used by the content provider 130 in validating whether it provided this content (as further described below). The watermark decoder 112 provides the decoded digital watermark, which includes the data for the one or more attributes describing the particular content item 106, to the token generator 114.

The token generator 114 (which is part of the operating system 118 or may be part of the web browser, if the web browser generates the digitally signed token) generates a digitally signed token using the data obtained from decoding the digital watermark, which includes the data for the one or more attributes describing the particular content item (at 208).

In some implementations, the digitally signed token is an attestation token that includes a set of data, which includes at least a user identifier and a payload, and in some instances, a device integrity token as well (in other words, the device integrity token can be, but need not be, included in the attestation token). The attestation token also includes a digital signature of this set of data. The following paragraphs describe each data item in the set of data and the digital signature of this set of data.

The user identifier that can be included in the attestation token includes a public key of the client device 102. For example, the client device 102 can generate and/or maintain one or more pairs of cryptographic keys including a device private key and a device public key. The device public key corresponds to, and is mathematically linked to, the device private key. Data that is digitally signed using a private key can only be verified using the corresponding public key. Similarly, data that is encrypted using the public key can only be decrypted using the corresponding private key.

The payload that can be included in the attestation token includes the data obtained from decoding the digital watermark, which includes the data for the one or more attributes describing the particular content item. The data for one or more of the attributes can be included in the payload as an array (or another data structure), with each position of the array including data for a separate attribute. In some implementations, the array can have N positions corresponding to the N possible attributes that may be encoded within a content item; however, data may only be stored at those array positions corresponding to attributes for which data is available based on the decoded watermark. In instances in which the watermark decoder determines that the content item does not include a digital watermark, the token generator 114 can include the message generated by the operating system 118, which indicates that the third party content item that was provided by the content provider 130 is not visible in the particular portion of the display of the client device.

The integrity token that can be included in the attestation token includes a device integrity token that enables an entity to determine whether a request was sent by a trusted client device 110. The device integrity token can be issued by a third-party device integrity system that evaluates fraud signals of client devices and assigns a level of trustworthiness to the client devices based on the evaluation. The device integrity token for a client device 102 can include (1) a verdict that indicates the level of trustworthiness (or integrity) of the client device 102 at the time that the device integrity token was generated, (2) a device integrity token creation time that indicates a time at which the device integrity token was generated, and (3) a unique identifier for the client device 102 (which can be, e.g., the device public key of the client device or its derivative). The device integrity token can also include a digital signature of the data in the device integrity token. This digital signature can be generated using a private key of the device integrity system.

For example, the device integrity system can sign the data using its private key, which the system maintains confidentially. The entities that receive the device integrity token can use a public key of the device integrity system to verify the signature of the device integrity token. Including the device public key for the client device 102 in both the device integrity token and the attestation token binds these two tokens together. In other words, by including the device public key of the client device 102 in the device integrity token, a recipient of the attestation token can determine that the device integrity token was generated for that client device 102. This prevents other parties from being able to include a device integrity token for a trusted device in requests from an emulator or a compromised client device.

The digital signature that can be included with the attestation token can be a digital signature of the above-described set of data (or some variant thereof). This digital signature is generated using the device private key, which can be maintained securely and confidentially by the operating system of the client device 102. When the web browser generates the digitally signed token, the browser can maintain the private key securely and confidentially. For example, the digital signature can be a digital signature of the payload, the user identifier (e.g., device public key), and the device integrity token. In some implementations, the operating system 118 generates the digital signature using an Elliptic Curve Digital Signature Algorithm (ECDSA), but other signature techniques can also be used, such as RSA.

In some implementations, instead of an attestation token, another type of digitally signed token can be generated by the token generator 116, which also can be used to secure the communication of the attribute data obtained by decoding the digital watermark. For example, the attribute data can be digitally signed using a private key of a third party integrity system. The entities that subsequently receive the device integrity token, such as the content provider 130, can request the corresponding public key from the third party integrity system, and then use this key to verify the signature and the attribute data.

Returning to the process 200, the operating system 118 (or the web browser, if the web browser generates the digitally signed token) provides the generated device integrity token to the application 104 (at 212).

The application 104 sends a digitally signed token to the content provider 130 (at 214) and the content provider 130 uses this token to validate whether the particular content item, CD 106, is a third party content item provided by the content provider 130 (at 216). In some implementations, the attribute values encoded in the digital watermark may be encrypted. As part of the validation, the content provider 130 decrypts the encrypted part of the digitally signed token to obtain data for the plurality of attributes that was encoded in the digital watermark (and was included in the payload of the token). In implementations in which the attestation token is used as the digitally signed token, the content provider 130 uses the device public key included in the attestation token to verify the digital signature included in the token.

The content provider 130 then verifies the digital signature included in the digitally signed token. In some implementations, the content provider 130 uses the device's private key to generate a digital signature using the data items included in the decrypted payload, device public key, and the encrypted device integrity token, and compares this generated digital signature with the digital signature included in the attestation token. If the comparison does not reveal identical digital signatures, the content provider 130 concludes that the content item (CD 106) provided for display within the particular portion of the display is not the third party content item that the content provider 130 provided. In some implementations, the content provider 130 can send a message to the application 104 indicating that there may be an error in the content platform 140, the application 104, the particular content page on which the content is displayed, or the content provider. On the other hand, if the comparison reveals identical signatures, the content provider 130 obtains the data for the one or more attributes included in the payload of the attestation token and continues with the content validation.

In some implementations, if the attestation token includes the signed device integrity token, the content provider 130 can interact with the device integrity system to obtain a public key for the system (as described above). This content provider 130 uses this public key to verify that the device integrity token was indeed created by the device integrity system and was not modified after creation, by verifying the digital signature in the device integrity token. If the digital signature in the device integrity token is successfully verified using the obtained public key, and if the device integrity data present in the verified device integrity token indicates that the device is trustworthy, the content provider 130 continues its content validation. However, if the device integrity token cannot be verified using the obtained public key, and if the device integrity data obtained upon verifying the token indicates that the device is untrustworthy, the content provider 130 can stop any further content validation. In such instances, the content provider 130 can also send a message to the application 104 indicating that there may be an error in the client device 102 that sent the digitally signed token to be used for content validation.

As part of the content validation, the content provider 130 obtains data for the one or more attributes for the third party content item that it previously provided to the content platform 150. In some implementations, the content provider 130 can search for this data from its repositories that store data about (1) content items that have been provided by the content provider 130, (2) the content platforms 140 to which the content items have been provided, and (3) the client devices 102 where the content items have been provided for display within an application used to access the content platform. In such implementations, the content provider 130 uses the device identifier (e.g., the device public key) for the particular client device 102 and the particular content platform 140 (e.g., a content platform identifier) that was accessed, to identify a set of content items and corresponding data for the one or more attributes for these content items. In this implementation, the content provider 130 identifies a set of content items and the associated attribute data that may be have been provided to the client device 102. In alternative or additional implementations, the content provider 130 can use data for one or more attributes included in the payload of the token to further narrow the data set identified. For example, if the payload of the token includes a timestamp (indicating a time when the content item was provided by the content provider 130) and a content item identifier, the content provider 130 can use this data to further limit and possibly isolate a single content item that was previously provided and its associated attribute data.

The content provider 130 compares the data for the one or more attributes that were encoded in the digital watermark (and obtained from the digitally signed token's payload) with the data for one or more attributes for a single content item or a set of content items identified by the content provider 130 (as described in the preceding paragraph). If the content provider 130 determines that the data for the one or more attributes encoded in the digital watermark is not identical to the data for the corresponding attributes for any of the content items that the content provider 130 identified from its repositories, the content provider 130 concludes that the particular content item, CI1 106, that is displayed on the client device 102 was not provided by the content provider 130. In such instances, the content provider 130 can send a message to the application 104 indicating that there may be an error in the content platform 140, the application 104, or the particular content page on which the content is displayed. On the other hand, if the content provider 130 determines that the data for the one or more attributes encoded in the digital watermark is identical to the data for the corresponding attributes obtained for any of the content items that the content provider 130 identified from its repositories, the content provider 130 generates a message indicating that the particular content item, CI1 106, is a third party content item provided by the content provider 130 and is visible to the user.

In the above-described process flow and system implementation, the operating system 118 decoded the digital watermark included in the content item and generated the encryption token based on the data obtained upon decoding the digital watermark, together with information known or verifiable by the operating system, including the device public/private key pair, and the token creation time. Alternatively, in some implementations in which the application 104 is a web browser, the browser—instead of the operating system 118—can be used to decode the digital watermark and generate the digitally signed token. Alternatively, in some implementations, while the operating system 118 may still decode the digital watermark, a separate entity (e.g., an application other than the application requesting the digitally signed token) can generate the digitally signed token. This implementation and the corresponding process flow is described with reference to FIG. 3 below.

FIG. 3 is a swim lane diagram that illustrates an example process 300 for detecting errors and/or verifying that third party content provided by a content provider to a content platform is actually displayed when the content platform is accessed on the client device and is visible to the user. Operations of process 300 are described below as being performed by the components of the system described and depicted in FIG. 1. Operations of the process 300 are described below for illustration purposes only. Operations of the process 300 can also be performed by any appropriate device or system, e.g., any appropriate data processing apparatus as described with reference to FIG. 4. Operations of the process 300 can also be implemented as instructions stored on a non-transitory computer readable medium.

Application A 104 renders a content page (at 302), which includes providing within the application 104, content items CI1 106 and CI2 108. As described with reference to FIGS. 1 and 2, one or more of these content items could be a third party content item that is obtained from a content provider 130.

Application A 104 sends a request to the operating system 118 to generate initial attestation data (at 304) that will be used, at least in part, to verify whether a particular content item, CI1 106, provided on a content page within the application 104 and displayed at a particular portion of the display of the client device 102, is a third party content item provided by a content provider 130. The request, which is sent by the application 104 and is received by the operating system 118, also identifies the particular portion of the display of the client device where the particular content item, CI1 106, is displayed. The initial attestation data requested by application A includes the following: (1) decoded data for the one or more attributes obtained from the particular content item (e.g., upon decoding a digital watermark included in the particular content item) or other data identified by the operating system based on an analysis of the particular content item (e.g., data indicating that no watermark was included in the particular content item); (2) data identifying the particular portion of the display of the client device; and (3) a first data item that, e.g., can be a message authentication code generated using the decoded data (or the other data identified by the operating system) and the data identifying the particular portion of the display. In some implementations, the initial attestation data can also include metadata, such as a timestamp that indicates when the decoded data is obtained (i.e., a time when the watermark decoder 112 decodes the digital watermark to obtain the data for the one or more attributes—as further described in operation 308). In such implementations, the first data item can be a message authentication code of the decoded data (or the other data identified by the operating system), the data identifying the particular portion of the display, and the metadata.

In some implementations, the application 104, which can be a native application, can include a software development kit (SDK) or an application programming interface (API) that cause the application 104 to generate the request and to provide with the request, the coordinates of the display (or alternatively, specifies the range of pixels on the device's display) that demarcate the particular portion of the display where the particular content item is displayed. In implementations where the application 104 is a web browser, a script executing on the page can generate the request and provide with the request, the coordinates of the display (or alternatively, specifies the range of pixels on the device's display) that demarcate the particular portion of the display where the particular content item is displayed.

In some implementations, the request for initial attestation data is part of a broader request by the application for verification of the particular content item provided for display within a particular portion of the client device's display.

The operating system 118 obtains a screenshot of the particular portion of the display (at 306). As described with reference to FIG. 2, the device display driver 110 uses the identification of the particular portion of the display (e.g., the coordinates or the pixel range), which was included in the request, to locate and generate a screenshot of the particular content item, CI1 106, provided for display in the particular portion of the display.

Using the screenshot obtained from the device display driver 110, the watermark decoder 112 determines if a digital watermark is present in the screenshot and if so, decodes the digital watermark (at 308). This operation is performed in substantially the same way as the similar operation (operation 206), which described with reference to FIG. 2. As described with reference to FIG. 2, if the screenshot of the particular portion of the display includes a digital watermark, the watermark decoder 112 decodes the digital watermark to obtain data for one or more attributes for the particular content item 106. On the other hand, if the watermark decoder 112 determines that the screenshot of the particular portion of the display does not include a digital watermark, the operating system 118 can conclude that the third party content item provided by the content provider 130 is either not displayed in the application 104, or if it is displayed, it is being hidden/covered by other content displayed within the application 104. In such instances, the operating system 118 generates a message indicating that the third party content item that was provided by the content provider 130 is not visible in the particular portion of the display of the client device.

The MAC generator 116 generates a message authentication code (MAC) of the decoded data (or the other data identified by the operating system), the data identifying the particular portion of the display, and the metadata (at 310). In some implementations, the MAC can be a hash-based message authentication code (HMAC), which is also referred to as keyed-hash message authentication code. The MAC generator 116 generates an HMAC of the decoded data (or the other data identified by the operating system), the data identifying the particular portion of the display, and the metadata (where applicable) using a secret cryptographic key of the operating system 118 (which is stored in a secure location within the client device). In some implementations, the operating system 118 includes the HMAC, with the decoded data (or the other data identified by the operating system), the data identifying the particular portion of the display, and the metadata, into a data structure. The data included in this data structure is referred to as the initial attestation data. In some implementations, the operating system 118 does not include these data items within a single data structure; however, the collections of these individual data items is still referred to as initial attestation data.

The operating system 118 sends, and the application 104 receives, the initial attestation data (at 312, 314).

Upon receiving the initial attestation data, the application 104 requests an attestation token from Application B 160 (at 316). In implementations where the request for the initial attestation data is part of a broader content verification request, the request for an attestation token can be automatically executed by the application upon receiving the initial attestation data. In some implementations, there may be delay in time between when the initial attestation data is received and when the request for an attestation token is generated. In such implementations, the application 104 in cooperation with the operating system 118 could generate initial attestation data associated with multiple content items presented within the application 104, but wait to request an attestation token until a content provider 130 (or another content verification system) requests content verification of the particular content item, CI1 106.

Before the application 160 generates the digitally signed token, the application 160 requests verification of the data provided in the initial attestation data. This is an effort to thwart any attempts of a malicious entity/application to deceive the content verification system by replacing the actual attestation data with fake data or data provided in initial attestation data associated with a different content item. Accordingly, the application 160 sends a request to operating system 118 to validate the initial attestation data (at 318). In some implementations, this request includes the initial attestation data that is to be validated by the operating system 118.

The operating system 118 verifies the initial attestation data (at 320). In some implementations, the operating system 118 verifies the initial attestation data in two steps. First, the operating system 118 generates an HMAC using its secret cryptographic key of the decoded data (or the other data identified by the operating system), the data identifying the particular portion of the display, and (where applicable) the metadata—all of which are included in the initial attestation data. The resulting value is referred to in this specification as the second data item.

The operating system compares this second data item with the first data item, which refers to the HMAC that is generated at operation 310 and is included within the initial attestation data (at 322). Based on the comparison, if the first data item matches the second data item, the operating system 118 generates a message indicating that the first data item matched the second data item (or in other words, the HMAC was verified/valid). On the other hand, if the first data item does not match the second data item, the operating system 118 generates a message indicating that the first data item did not match the second data item (or in other words, the HMAC was not verified/valid). The operating system 118 sends the generated message to the application 160 (i.e. APP B in FIG. 3).

Upon receiving this message, the application 160 (i.e. APP B in FIG. 3) generates the encryption token (at 324). In some implementations, the application 160 (i.e. APP B in FIG. 3) generates the encryption token regardless of the outcome of the HMAC; in other implementations, the application 160 only generates the encryption token when the HMAC is determined to be valid at operation 322.

The application 160 (i.e. APP B in FIG. 3) generates the digitally signed token using the data included with the initial attestation data, namely, the decoded data for the one or more attributes obtained from the particular content item (e.g., upon decoding a digital watermark included in the particular content item) or other data identified by the operating system based on an analysis of the particular content item (e.g., data indicating that no watermark was included in the particular content item). The application 160 generates the digitally signed token in substantially the same manner as described with reference to operation 210 in FIG. 2.

The application 160 sends the generated digitally signed token to the application 104, which in turn sends the digitally signed token to the content provider 130 (or another appropriate content verification system).

The content provider 130 validates the digitally signed token (at 326) in substantially the same manner as described with reference to operation 216 in FIG. 2.

In the above described process flow of FIG. 3, the application 160 (i.e., application B shown in FIG. 1) is separate from the operating system. However, in other alternative implementations, the application 160 may be part of the operating system 118. In such implementations, generating and validating the HMAC (as described in operations 310 to 314 and 318 to 322) is not necessary. This is because, unlike in the above description of FIG. 3, the entity that generates the initial attestation data (i.e., the operating system 118) is the same as the entity that generates the attestation token (i.e., Application B 160, which is part of the operating system 118 in this alternative implementation). This alternative implementation is described below.

In this alternative implementation, the request 304 can be a request for the initial attestation data (which is the same as operation 304 described above) or it may be a request for a digitally signed token (similar to operation 204 described with reference to FIG. 2). The operating system 118 still performs the operation of taking the screenshot and decoding the digital watermark (i.e., operations 306 and 308). The operating system 118 does not generate an HMAC as described at operation 310. Instead, the relevant components (i.e., components 110-112) of the operating system 118 provide the data included in the request 304 along with the data obtained/generated at operations 306 and 308, to the application B 160, which is also part of the operating system 118.

If the initial request from the application 104 was a request for initial attestation data, the operating system 118 indicates to the application 104 that the initial attestation data has been collected. However, the operating system 118 need not provide the data to the application 104 in this implementation. In some implementations, the operating system can send this data to the application 104. The application 104 then sends a separate, second request for the digitally signed token to the application B, which is now part of the operating system 118. This request includes the data provided to the application 104 by the operating system 118. The operating system first validates whether the data that it previously provided to the application B 160 is the same as the data received from the application 104 in the second request. If the data matches, the application B proceeds to generate the digitally signed token; otherwise, the application B concludes that there is an error. This processing replaces the operations 318-322 described above with reference to FIG. 3.

Alternatively, if the initial request from the application 104 was a request for the digitally signed token, the operating system 118 does not send any response to the application 104 and the application 104 also does not send any additional request to the operating system 118.

The application B generates the digitally signed token using the data included in the request 304 and/or the data obtained generated at operations 306 and 308 in substantially the same manner as described with reference to operation 324 above.

The content provider 130 validates the digitally signed token in substantially the same manner as described above with reference to operation 326.

Figure 4:
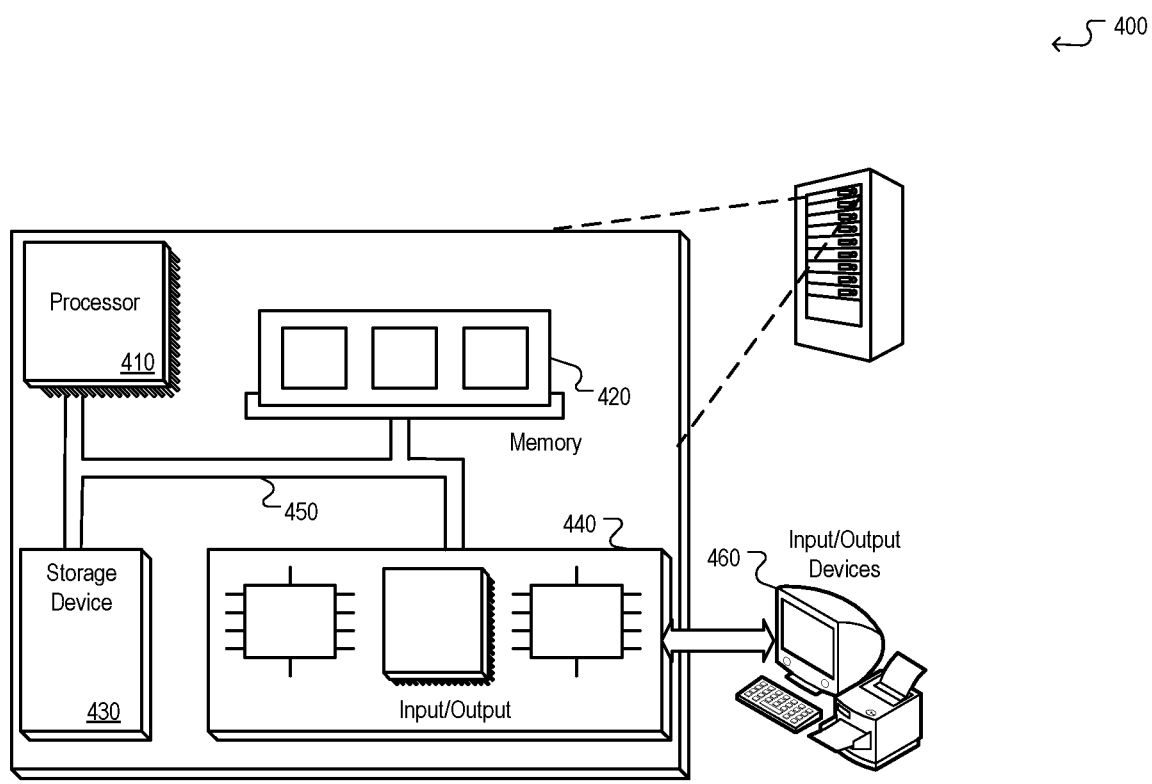
FIG. 4 is block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Media does not necessarily correspond to a file. Media may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer implemented method comprising:
receiving, from an application executing on a client device, a request to generate a digitally signed token that is used to validate whether a particular content item, provided on a content page within the application and displayed at a particular portion of the display of the client device, is a third party content item provided by a content provider, wherein the request identifies the particular portion of the display;
determining whether a digital watermark is embedded in the particular content item displayed at the particular portion of the display; and
in response to determining that a digital watermark is embedded in the particular content item:
decoding the digital watermark to obtain data for a plurality of attributes encoded within the digital watermark, wherein the plurality of attributes are descriptive of the particular content item;
generating the digitally signed token that includes the data for the plurality of attributes in a payload of the digitally signed token; and
providing, to the application, the generated digitally signed token.

2. The computer implemented method of claim 1, further comprising:
validating, using the digitally signed token, whether the particular content item, which is provided on the content page within the application and displayed at the particular portion of the display of the client device, is the third party content item provided by the content provider, the validating includes:
verifying that a digital signature included in the digitally signed token is valid, wherein the verifying includes generating a digital signature using data other than the digital signature included in the digitally signed token;
obtaining, from the content provider, data for the plurality of attributes for the third party content item; and
determining that the data for the plurality of attributes encoded in the digital watermark is identical to the data for the corresponding plurality of attributes obtained for the third party content item and in response, generating a message indicating that the particular content item is the third party content item.

3. The computer implemented method of claim 1, further comprising:
in response to determining that a digital watermark is not embedded in the particular content item, generating a digitally signed token that includes, in the payload of the digitally signed token, a message indicating that the third party content item is not visible in the particular portion of the display of the client device; and
providing, to the application, the generated digitally signed token.

4. The computer implemented method of claim 1, the method further comprising obtaining, using the particular portion of the display, a screenshot of the particular content item displayed at the particular portion of the display;
wherein obtaining the digital watermark embedded in the particular content item includes obtaining the digital watermark from the obtained screenshot of the particular content item displayed at the particular portion of the display.

5. The computer implemented method of claim 1, wherein the obtained digital watermark encodes data about two or more of the following attributes:
a content type of the third party content item;
a description of content provided in the third party content item;
an identification of the third party content provider;
a unique identifier for the third party content item;
size parameters of the third party content item;
a timestamp indicating a time when the digital watermark was created; and
a digital signature of the third party content provider.

6. The computer implemented method of claim 1, wherein the digitally signed token is an attestation token that includes (1) a device public key of the client device; (2) a payload that includes the data for the plurality of attributes; (3) a device integrity token that identifies a trustworthiness of the client device, wherein the device integrity token is signed by a trusted device integrity system; and (4) a digital signature of the device public key, the payload, and the device integrity token, wherein the digital signature is generated using a device private key for the client device that corresponds to and is mathematically linked to the device public key.

7. A computer implemented method, comprising:
receiving, from an application executing on a client device, a request to generate a digitally signed token that is used to validate whether a particular content item, which is provided on a content page within the application and displayed at a particular portion of the display of the client device, is a third party content item provided by a content provider, wherein:
  the request includes initial attestation data obtained from an operating system of the client device, wherein the initial attestation data includes (1) decoded data for a plurality of attributes that was encoded within a digital watermark embedded in the particular content item displayed at the particular portion of the display, wherein the plurality of attributes are descriptive of the particular content item; (2) data identifying the particular portion of the display; and (3) a first data item that is generated using the decoded data and the data identifying the particular portion of the display;
  obtaining, from the operating system, an indication specifying whether the first data item matches a second data item, wherein the second data item is generated by the operating system using the decoded data and the data identifying the particular portion of the display that are included with the request; and
  in response to obtaining the indication specifying that the first data item matches the second data item:
    generating a digitally signed token that includes the data for the plurality of attributes in the payload of the digitally signed token; and
    providing, to the application, the generated digitally signed token.

8. The computer implemented method of claim 7, wherein each of the first data item and the second data item is a hashed message authentication code.

9. A system comprising:
  one or more memory devices storing instructions; and
  one or more data processing apparatus that are configured to interact with the one or more memory devices, and upon execution of the instructions, perform operations including:
    receiving, from an application executing on a client device, a request to generate a digitally signed token that is used to validate whether a particular content item, provided on a content page within the application and displayed at a particular portion of the display of the client device, is a third party content item provided by a content provider, wherein the request identifies the particular portion of the display;
    determining whether a digital watermark is embedded in the particular content item displayed at the particular portion of the display; and
    in response to determining that a digital watermark is embedded in the particular content item:
      decoding the digital watermark to obtain data for a plurality of attributes encoded within the digital watermark, wherein the plurality of attributes are descriptive of the particular content item;
      generating the digitally signed token that includes the data for the plurality of attributes in a payload of the digitally signed token; and
      providing, to the application, the generated digitally signed token.

10. The system of claim 9, wherein the one or more data processing apparatus are configured to perform operations further comprising:
  validating, using the digitally signed token, whether the particular content item, which is provided on the content page within the application and displayed at the particular portion of the display of the client device, is the third party content item provided by the content provider, the validating includes:
    verifying that a digital signature included in the digitally signed token is valid, wherein the verifying includes generating a digital signature using data other than the digital signature included in the digitally signed token;
    obtaining, from the content provider, data for the plurality of attributes for the third party content item; and
    determining that the data for the plurality of attributes encoded in the digital watermark is identical to the data for the corresponding plurality of attributes obtained for the third party content item and in response, generating a message indicating that the particular content item is the third party content item.

11. The system of claim 9, wherein the one or more data processing apparatus are configured to perform operations further comprising:
  in response to determining that a digital watermark is not embedded in the particular content item, generating a digitally signed token that includes, in the payload of the digitally signed token, a message indicating that the third party content item is not visible in the particular portion of the display of the client device; and
  providing, to the application, the generated digitally signed token.

12. The system of claim 9,
  wherein the one or more data processing apparatus are configured to perform operations further comprising obtaining, using the particular portion of the display, a screenshot of the particular content item displayed at the particular portion of the display; and
  wherein obtaining the digital watermark embedded in the particular content item includes obtaining the digital watermark from the obtained screenshot of the particular content item displayed at the particular portion of the display.

13. The system of claim 9, wherein the obtained digital watermark encodes data about two or more of the following attributes:
  a content type of the third party content item;
  a description of content provided in the third party content item;
  an identification of the third party content provider;
  a unique identifier for the third party content item;
  size parameters of the third party content item;
  a timestamp indicating a time when the digital watermark was created; and
  a digital signature of the third party content provider.

14. The system of claim 9, wherein the digitally signed token is an attestation token that includes (1) a device public key of the client device; (2) a payload that includes the data for the plurality of attributes; (3) a device integrity token that identifies a trustworthiness of the client device, wherein the device integrity token is signed by a trusted device integrity system; and (4) a digital signature of the device public key, the payload, and the device integrity token, wherein the digital signature is generated using a device private key for the client device that corresponds to and is mathematically linked to the device public key.

15. A non-transitory computer-readable medium comprising:
  one or more memory devices storing instructions; and one or more data processing apparatus that are configured to interact with the one or more memory devices, and upon execution of the instructions, perform operations including:

receiving, from an application executing on a client device, a request to generate a digitally signed token that is used to validate whether a particular content item, provided on a content page within the application and displayed at a particular portion of the display of the client device, is a third party content item provided by a content provider, wherein the request identifies the particular portion of the display;

determining whether a digital watermark is embedded in the particular content item displayed at the particular portion of the display; and in response to determining that a digital watermark is embedded in the particular content item:

decoding the digital watermark to obtain data for a plurality of attributes encoded within the digital watermark, wherein the plurality of attributes are descriptive of the particular content item;

generating the digitally signed token that includes the data for the plurality of attributes in a payload of the digitally signed token; and providing, to the application, the generated digitally signed token.

16. The non-transitory computer-readable medium of claim 15, wherein the instructions cause the one or more data processing apparatus to perform operations comprising:

validating, using the digitally signed token, whether the particular content item, which is provided on the content page within the application and displayed at the particular portion of the display of the client device, is the third party content item provided by the content provider, the validating includes:

verifying that a digital signature included in the digitally signed token is valid, wherein the verifying includes generating a digital signature using data other than the digital signature included in the digitally signed token;

obtaining, from the content provider, data for the plurality of attributes for the third party content item; and determining that the data for the plurality of attributes encoded in the digital watermark is identical to the data for the corresponding plurality of attributes obtained for the third party content item and in response, generating a message indicating that the particular content item is the third party content item.

17. The non-transitory computer-readable medium of claim 15, wherein the instructions cause the one or more data processing apparatus to perform operations comprising:

in response to determining that a digital watermark is not embedded in the particular content item, generating a digitally signed token that includes, in the payload of the digitally signed token, a message indicating that the third party content item is not visible in the particular portion of the display of the client device; and providing, to the application, the generated digitally signed token.

18. The non-transitory computer-readable medium of claim 15, wherein the instructions cause the one or more data processing apparatus to perform operations further comprising obtaining, using the particular portion of the display, a screenshot of the particular content item displayed at the particular portion of the display; and wherein obtaining the digital watermark embedded in the particular content item includes obtaining the digital watermark from the obtained screenshot of the particular content item displayed at the particular portion of the display.

19. The non-transitory computer-readable medium of claim 15, wherein the obtained digital watermark encodes data about two or more of the following attributes:

a content type of the third party content item;

a description of content provided in the third party content item;

an identification of the third party content provider;

a unique identifier for the third party content item;

size parameters of the third party content item;

a timestamp indicating a time when the digital watermark was created; and a digital signature of the third party content provider.

20. The non-transitory computer-readable medium of claim 15, wherein the digitally signed token is an attestation token that includes (1) a device public key of the client device; (2) a payload that includes the data for the plurality of attributes; (3) a device integrity token that identifies a trustworthiness of the client device, wherein the device integrity token is signed by a trusted device integrity system; and (4) a digital signature of the device public key, the payload, and the device integrity token, wherein the digital signature is generated using a device private key for the client device that corresponds to and is mathematically linked to the device public key.

* * * * *